United States Patent Office 2,909,061
Patented Oct. 20, 1959

2,909,061

DRAG SENSITIVE WIND TUNNEL MODEL SUPPORT

Herman R. Gelbach and Lambert Owen, Seattle, Wash., assignors to Boeing Airplane Company, Seattle, Wash., a corporation of Delaware Application November 17, 1955, Serial No. 547,500

13 Claims. (Cl. 73—147)

Models are tested in wind tunnels under various conditions to determine the amount and direction of various forces and moments acting upon the model. It is desirable to measure these forces at the model itself, or as near thereto as is feasible, for instance at the balance by which the model is supported, thereby eliminating the necessity for measuring indirectly the forces applied to the strut that carries the balance and sting, and compensating for the forces which affect the strut itself in order to calculate the forces active upon the model. Such models are commonly made to a small scale, especially of high-speed airplanes, for wind-tunnel testing, wherefore the forces acting upon the model are themselves small, and because of the space available, it is difficult to incorporate within the balance structures and sensing devices for sensing at one time the several individual forces which act simultaneously upon the model, yet it is important that this be done, and that each force as measured be distinct from and unaffected by all other forces. For instance, it may be desired to measure simultaneously six such forces, for instance, drag, lift, pitching moment, side force, yawing moment, and rolling moment. The interaction of these forces, unless controlled and the effects of the individual forces segregated, will produce incorrect or confused test data.

The present invention is concerned, in particular, with the measurement of drag force, apart from any of the other forces mentioned, notwithstanding that the drag force is likely to be quite small in relation to the other forces and moments mentioned, and all are active upon the model and hence upon the balance at the time the drag force is being measured.

It is the primary object of the present invention to provide a wind tunnel model support or balance, so constructed as to enable the measurement of drag force separately from all other forces and moments, within the balance itself, and notwithstanding the smallness of such drag force as compared to other forces acting simultaneously upon the model so supported, and notwithstanding the small size of the model and the balance. In accomplishing this end, it is a subsidiary object to provide a wind tunnel model support or balance so constructed and arranged as to resist and be substantially insensitive to all forces which act (as do the forces other than drag) transversely to the longitudinal neutral axis of the balance, either wholly so in the particular portion under consideration, or if in this portion not wholly insensitive to such forces other than drag, which acts in the direction of the balance's longitudinal neutral axis, then so constructed and arranged that such other forces do not affect the distortion of the balance which results from drag force, nor the indictaion of such drag force independently of all other such forces. Nevertheless, in this portion or in other portions the balance may be so constructed and arranged as to be sensitive to, and to indicate the effect of, such other forces. Such a balance must, in the portion devoted to measurement of drag force, be capable of generating and transmitting a signal as a sole result of drag force, the strength of which signal is a measure of the strength of the effective drag force, to a distant point where such strength will be indicated accurately, independently of all other forces active at the same time upon the model or upon the balance, and can be read in terms of the drag force, alone, generated at the model.

It is, of course, an object to provide a balance adapted for the measurement of drag forces, of the character just indicated, which shall be compact and so capable of cooperation with a model of the normally small scale commonly employed.

With such objects in mind, and others as will appear more fully hereinafter, the present invention comprises the novel wind tunnel model support for measuring drag forces, and the novel combination and arrangement of the parts thereof, which together with the method of manufacturing such a wind tunnel model support is shown in the accompanying drawings, and will be more fully explained in this specification. The novel features of the wind tunnel model support which constitute this invention will be set forth in the claims.

The drawings illustrate presently preferred constructions of the drag-measuring wind tunnel model support, and the preferred method of construction, but it is to be understood that these are to be taken as illustrative rather than as restrictive.

Figure 1:
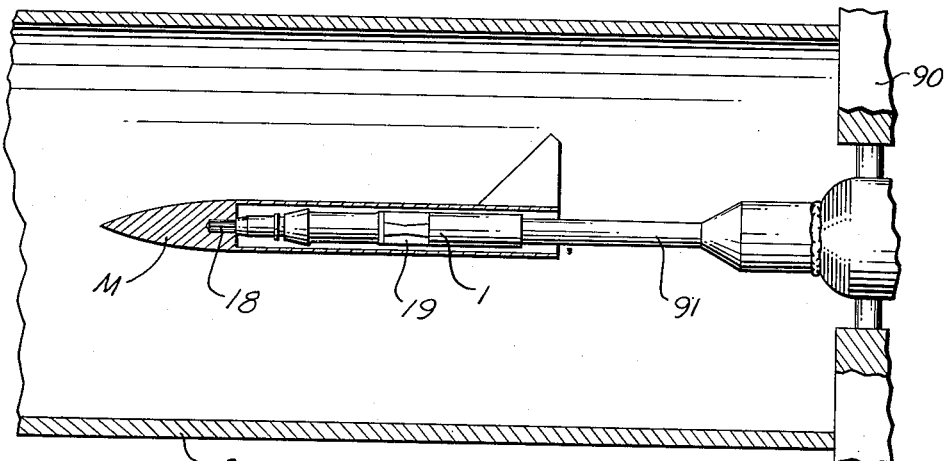
Figure 1 is a general and somewhat diagrammatic axial sectional view through a wind tunnel and through a model mounted therein upon the balance of the present invention, which is shown in side elevation.
Figure 2:
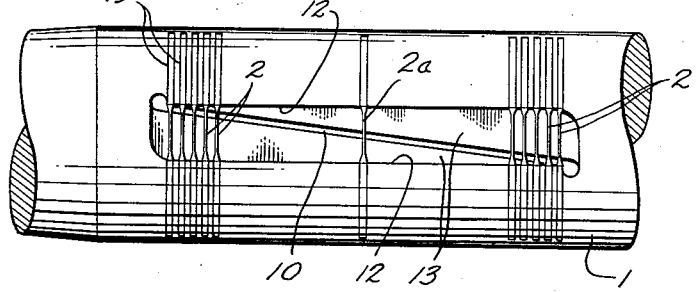
Figure 2 is an elevational view of the support shown in an intermediate stage of its construction.
Figure 3:
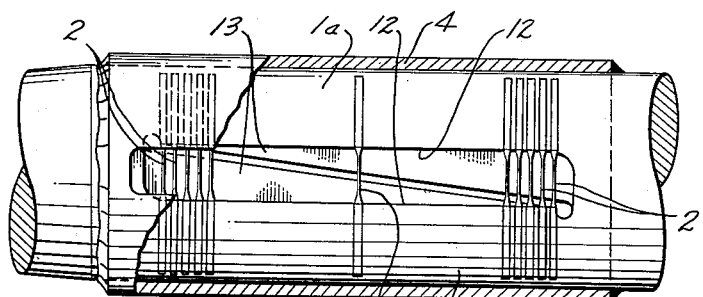
Figure 3 is a similar view, showing the support in a subsequent stage.
Figure 4:
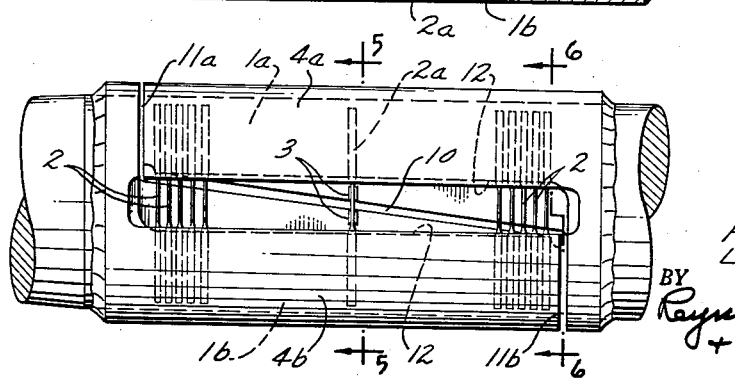
Figure 4 is a similar view, showing the completed support.
Figure 5:
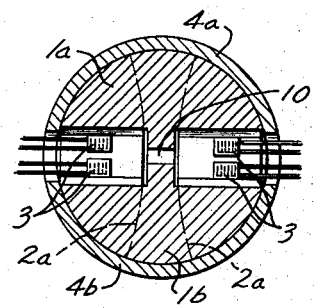
Figure 5 is a transverse sectional view at the line 5—5 of Figure 4.
Figure 6:
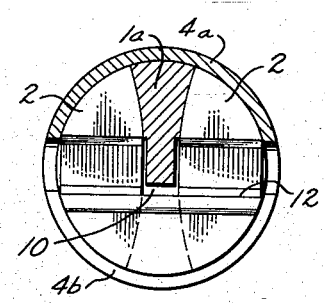
Figure 6 is a similar view at the line 6—6 of Figure 4.
Figure 7:
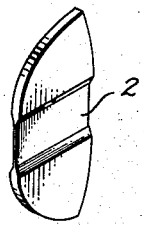
Figure 7 is an isometric view of an individual flexure, or flexible plate.

Speaking generally, the wind tunnel model support of the present invention, at least in the portion which concerns this invention, incorporates a balance or bar which, being of normal approximately unidimensional cross section—approximately round—is inherently rigid, but which is divided into two longitudinally overlapping parts, wholly separate one from another. These overlapping parts are joined by flexures in the form of a plurality of flexures or flexible plates, oriented transversely to and spaced along the length of the balance. These flexible plates join the two separate but overlapped parts of the balance in such a way that the flexures are substantially insensitive to all forces which act in planes transverse to the neutral longitudinal axis of the balance. All such forces, which arise from forces other than drag, will be transmitted by such plates between the two parts of the balance as though the balance were integral. On the other hand, such plates will flex sufficiently readily under the influence of a force acting in the direction of length of the balance that this longitudinal force, which arises from drag originating in the supported model, may be sensed independently of all other forces acting upon the model. The sensing means is operatively associated with one or more of the flexible plates, so that whenever the latter flexes, this flexure will initiate a signal which can be suitably made evident to the observer. It is so located and coordinated with the balance as a whole that the induced signal strength becomes an accurate measure of the drag force. The manner of mounting the flexures tends to weaken the individual parts of the balance, and they are reinforced to restore their original strength and rigidity.

It is preferred that the flexible plates be arranged in two groups located at the respectively opposite ends of the overlapped portions of the balance, plus a single plate located approximately midway of the two groups, or at least, symmetrically with respect thereto, this latter plate being the one which by its flexure senses the drag forces applicable to the balance. In this arrangement the two groups of plates restore the continuity of the discontinuous balance for transmission of forces acting transversely to the balance's axis, as do forces arising from lift or creating pitching, yawing, or rolling moments, etc., yet all are yieldable under the influence of drag force, and the single symmetrically located plate accurately measures the drag force.

Because of the small size which the balance must be in order to accommodate the small model within which it fits, and yet because the balance must be inherently rigid against all forces other than the drag force in this particular portion of the balance, the balance, in its usual form, is preferably formed as a bar of appropriate section (such as round) reduced, in the drag-measuring portion, to an approximate I-section, with the flexible plates joining the flanges of the respectively opposite overlapped portions, and restoring approximately the original section. An encasing shell, in the region of the flexible plates, restores any loss of strength to resist torsional or lateral forces.

As has been suggested above, the balance may also have other portions, and ordinarily would have, which are otherwise formed in a manner to measure the several other forces and moments acting upon the supported model, but the present invention is not concerned with these other portions or measurements. Nevertheless, the balance is shown in the accompanying drawings of a form to measure such other forces.

The model being tested may be a hollow body, such as a nacelle, and if so the balance can not project within the tunnel thereof, for this would set up extraneous forces that would affect the test's accuracy. It is possible to incorporate like principles in a balance for the support of a hollow body during such a test. The latter type of balance would itself be hollow and cylindrical.

In Figure 1 the wind tunnel throat is indicated at 9, and a transverse strut 90 constitutes a support for a sting 91 projecting within the throat upstream of the direction of airflow, whereon the balance of the present invention, designated in general by the numeral 1, is supported. Upon the forward end of this balance is mounted a model M of an airplane under test. It is the drag force upon this model which the balance of the present invention is designed to sense and measure, independently of the other forces and moments such as lift, pitching moment, side force, yawing moment, and rolling moment. These latter forces, all active at the same time upon or produced by the model, are otherwise sensed and measured, and the balance in the region 19 may be formed to measure the same simultaneously with the measurement of drag. With this portion of the balance the present invention is not concerned, and mention is made thereof only for the purpose of clarifying the functional independence of the present invention from the measurement of these other forces and moments. Hereinafter it will be assumed that the balance is designed to measure only drag forces, and it will be described as though the portion 19 were omitted.

The balance is secured at its rear end rigidly to the sting 91, and the latter to the strut 90, and at its forward end, at 18, is formed for securement rigidly to the model M. In between it is or may be substantially rigid in all directions. Since a typical model may have a longitudinally directed aperture no greater than one inch in diameter, the balance must be of a size to fit within the same and to avoid all contact with the model.

The balance is formed as a rigid bar 1, shown as of round cross-section, but is longitudinally and transversely slotted, as indicated at 10, to divide it into two separate parts which, for convenience of reference, are designated 1a and 1b. It is immaterial whether the slot 10 be viewed as from the side or as from above; by preference, it is as viewed from the side. The slot 10 preferably is directed somewhat slantingly or diagonally, as viewed from the side, and terminates in two oppositely directed transverse slots 11a and 11b lying preferably in substantially radial planes perpendicular to the neutral longitudinal axis of the balance. Thus, by the slots 11a, 10, and 11b, the rigid balance 1 is divided into two wholly separate, but longitudinally overlapping portions 1a and 1b.

These two portions, 1a and 1b, are joined by a plurality of flexures of flexible plates generally designated by the numeral 2, which are disposed in planes perpendicular to the neutral longitudinal axis of the balance, and which bridge the slot 10. In order to afford space for flexing of these flexures 2 under the drag forces, it is preferable that the balance 1 in the region of the slot 10 be formed of generally I-section. This is done readily by milling a slot 12 at each side of a central web portion 13, leaving the opposite flange portions which are not reduced in cross-section. These flange portions are joined by the flexible plates 2; each such plate is rigidly joined at its one end to the flange portion of the part 1a, and at its other end is similarly rigidly joined to the flange portion of the part 1b. The manner of accomplishing this will be explained later. The intermediate portions of the plates 2 are free of contact with any part of the balance 1. Preferably, the plates are arranged symmetrically with relation to a single flexure plate, as, for example, in two groups of several plates each, located adjacent the respectively opposite ends of the slot 10, together with the single flexure plate which, to distinguish it, is designated 2a, and is located midway between the two groups and midway between the ends of the slot 10, that is to say, symmetrically with respect to these groups. Also, these plates are located in part at one side of the web portion 13, and in part at the opposite side of that web portion. Each plate is not necessarily equal in flexibility or strength to all others, but the cumulative effect of all plates in the group at one end is equal to the cumulative effect of all plates in the group at the opposite end. Thus, there is complete symmetry as between the groups of flexible plates, and of these groups relative to the plate 2a. They are oriented in such a way that they will cooperatively and collectively resist compressional or tensional forces acting in the planes of the several flexible plates, yet will flex. collectively upon the incidence of a drag force which tends to urge the part 1b lengthwise with respect to the part 1a. The central location of the plate 2a makes the latter least likely to be sensitive to extraneous forces, other than the drag force.

Because the manner of mounting the plates 2 and 2a, to be described shortly, may to some degree weaken the balance, and so introduce the possibility of its flexing, in the drag-measuring region, from torsional or lateral forces, or even in tension or compression from components of forces other than drag, it is preferable to encase this drag-measuring region in a shell 4a and 4b, originally a sleeve 4 encasing the balance, but cut away in correspondence with the slot 10, 11a, and 11b. Each half of this shell encases the flexures and bridges the slits wherein their ends are inserted, and being brazed or otherwise bonded to the balance bar halves, this shell makes the balance bar halves wholly rigid, yet interconnected through the flexure plates which are sensitive to drag forces only.

Since the flexible plate 2a is sensitive to, and will flex under the influence of, drag forces alone, it is possible to sense its flexure, and the extent thereof, when flexed by drag force, by locating sensitive devices, such for instance as strain gauges, upon at least this one of these plates, in a manner known in the art, to sense the flexure thereof. Preferably, four such strain gauges 3 are located upon each of the halves of the flexible plate 2a, and these are connected to a sensitive indicating system, such for instance as a balanced Wheatstone bridge (not shown), which is common in the art in connection with such strain gauges, to detect and indicate flexure of the plate 2a and the extent thereof. The degree of flexure of the plate 2a is a measure of the drag force, and of that force alone, which is applied to the balance 1, yet the rigidity of the balance is otherwise restored through the several plates 2, and the shell 4a, 4b if the latter is used, and, hence, it is insensitive to the other forces and moments acting upon the supported model, at least in the portion under consideration.

In the manufacturing of the balance 1, it is preferred that it be milled out at 12, or otherwise altered from its approximately round cross-section, to define the web 13 in the manner already described, before or after cutting the slot 10, and that it be then slit transversely of both flange portions to define the slits 15. In each slit is inserted the end of a flexible plate 2 or 2a, which fits snugly therein, and is of a contour generally conforming to its half of the balance's cross section. After seating the ends of the plates in place in their respective slits, they may be brazed or similarly secured in place, although this is unnecessary if the shell parts 4a, 4b are brazed to the respective parts 1a, 1b of the balance bar. After heat-treating the assembly to strengthen it, the slots 11a and 11b are cut, as is the sleeve from which the encasing shell is cut to form 4a and 4b. This severs the two portions 1a and 1b completely. The strain gauges 3 are then installed and calibrated. Because the flexures 2 or 2a are not in a particularly confined space, and thus may be quenched rapidly, heat treatment as described above is possible.

As a result of the design and construction of the balance as described above, it has been found possible, in a typical test, to measure accurately drag forces in a range of 1 to 10 pounds without having the measurement complicated nor affected by stray forces from a simultaneous 75-pound side force, 150 pounds of lift, 200 inch-pounds of pitching moment, 130 inch-pounds of yawing moment, and 50 inch-pounds of rolling moment. It will be realized, of course, that these values are scale values, and would be multiplied many times to determine the corresponding forces and moments acting upon a full size airplane. It is because of this that the accurate measurement of the small drag force, uncomplicated by these other and usually much larger forces, is highly essential in such a wind tunnel model support.

Figure 10:
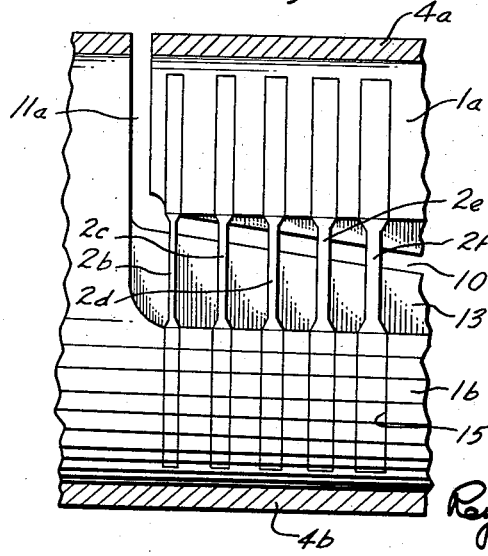
Figure 10 is an enlarged detail, in elevation, of a somewhat modified construction.

In Figure 10 the flexures, designated 2b, 2c, 2d, etc., respectively, are of graduated flexibility, but, being subjected to different total drag force by reason of their different moment arms, are equally resistant to or flex equally as a result of a given applied drag load. This is a possible refinement, although one that has not heretofore been found necessary.

Figure 8:
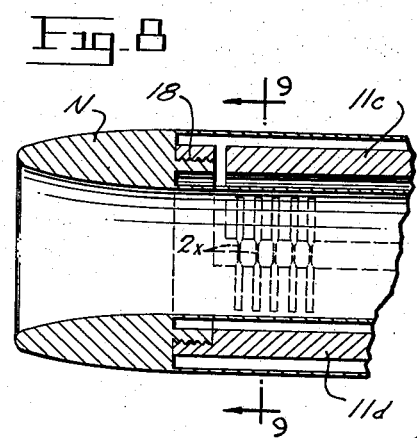
Figure 8 is an axial sectional view of a hollow structure and a support for the same, such as incorporates the principles of this invention.
Figure 9:
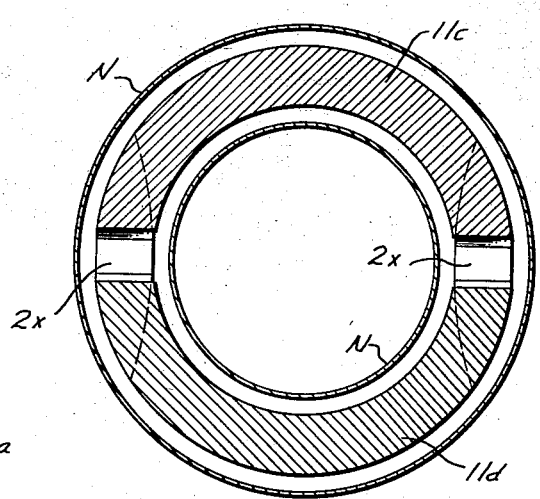
Figure 9 is a cross-sectional view of the same, indicated at 9—9 in Figure 8.

When the model under test is a hollow body, such as the nacelle N, the balance must be modified so that it does not, by its presence within the airflow through the model's tunnel, affect the indicated results. In Figures 8 and 9 the balance is of hollow cylindrical form, to fit within the inner and outer skin contours of the model. Its two parts 11c and 11d are wholly separate, and substantially semi-cylindrical, but are connected through flexures 2X, arranged in the grouping previously described, and restoring the rigidity of the balance as before, against all except drag forces.

We claim as our invention:

1. A wind tunnel model support comprising an elongated balance bar formed at one end for the support of a model, and at its other end for support from a stinger or the like, to dispose the balance bar in alignment with the direction of airflow, said balance bar being divided between its ends into two separate and inherently rigid parts disposed in longitudinally overlapping relationship, a plurality of plates oriented in parallel planes perpendicular to the longitudinal neutral axis of the balance bar, and joining the respective parts of the bar, said plates being arranged in two like groups of several plates each, located adjacent the respective ends of the overlapped parts of the balance bar, and a single plate located approximately midway between the groups, each plate being flexible under forces applied transversely to its plane, but substantially unyielding to forces applied within its plane, and means operatively connected to said single plate to sense flexing thereof under the influence of relative longitudinal movement of the two overlapped parts of the balance bar.

2. A wind tunnel model support as in claim 1, wherein the plates of the respective groups are of decreasing flexibility from those most remote from the single plate to those nearest the same.

3. A wind tunnel model support as in claim 1, wherein the balance bar, in its overlapped portion, is of generally I-section, with its web portion disposed in the longitudinal axial plane of the bar, and the two parts are separated along a line extending lengthwise of the web portion, and through the respective flange portions at the opposite ends, and the flexible plates extend between and join the respective flange portions.

4. A wind tunnel model support as in claim 3, characterized in that the line of separation along the web portion of the I-section is slanted from the junction of one flange portion and said web portion, at one end, to the junction of the other flange portion and said web portion, at the opposite end.

5. A wind tunnel model support as in claim 1, wherein the balance bar, in its overlapped portion, is of generally tubular cross-section, and the two parts are separated along a generally diametral horizontal plane through the axis, the flexible plates being disposed between and connecting opposite edges of the half-cylindrical parts of the balance bar.

6. A wind tunnel model support comprising an elongated balance bar formed, in at least a part of its length, of I-section, and having a slot through the respective flange portions at longitudinally spaced points and a continuation of such slot along the web portion and joining the two flange slots, dividing the balance bar into two separate overlapped parts, each of which includes a flange component and a partial web component; means to support said balance bar at one end in horizontal disposition, in alignment with the direction of airflow, the balance bar being formed at its opposite end for securement to a supported model; the flange portions of the two parts being slit in parallel vertical planes oriented transversely to the neutral longitudinal axis of the balance bar, and spaced lengthwise of the balance bar, a plurality of parallel flexible plates each received at one end in and secured immovably within the respective slits of one part of the balance bar, and each similarly received and secured immovably within the corresponding slits of the other part of the balance bar, collectively bridging the slot between the two parts and joining the latter to resist relative displacement by forces directed in the planes of said plates, but permitting such displacement by flexure of the plates under the influence of forces directed lengthwise of the balance bar, and means operatively connected to one such plate to sense its flexure.

7. A wind tunnel model support as in claim 6, wherein the plates are disposed in part at one side of the web portion of the I section, and in equal part at the opposite side thereof, in planes parallel to the plates of the first part.

8. A wind tunnel model support as in claim 6, wherein the slot along the web portion is inclined from the slot through one flange portion to the slot through the opposite flange portion, the plates being disposed in two groups of several plates each, closely spaced adjacent the respective ends of the web's slot, and a single plate located approximately midway between the ends of the web's slot, the sensing means being operatively connected to said single plate.

9. A wind tunnel model support as in claim 6, including a sleeve embracing the balance bar and the flexible plates joining the two overlapped parts of the balance bar, and secured to the respective parts of the balance bar, said sleeve being slotted in correspondence with the slotting of the balance bar to define two separate parts, embracing the respective parts of the balance bar.

10. A wind tunnel model support for the measurement of drag forces to the exclusion of other components of the forces and moments active upon a model supported at its one end, while itself supported at its opposite end, comprising a bar formed of two separate but complemental parts, for disposition horizontally when in use, and formed with a vertical web extending lengthwise of the bar and with top and bottom flanges directed laterally to both sides of said web, the upper flange and a part of the web being integral and comprising a first part spaced somewhat vertically above the second part formed by the remainder of the web and the integral lower flange, in overlapping disposition, a plurality of flexible plates disposed in parallel vertical planes which are substantially normal to the length of the bar, and located at opposite sides of the web, said flexible plates being joined at their upper and lower ends to the upper and lower flanges, respectively, and means operatively connected to at least one of said flexible plates to sense flexing thereof, under the influence of longitudinal drag force tending to produce relative longitudinal movement of the two parts of the bar.

11. A wind tunnel model support for the measurement of drag forces to the exclusion of other components of the forces and moments active upon a model supported at its one end, while itself supported at its opposite end, comprising a two-part bar for disposition horizontally when in use, and formed with at least one component directed primarily vertically and longitudinally of the bar, and with two other components directed primarily horizontally and also longitudinally, at least one of the horizontally directed components and a part of the total of the vertically directed components being formed integrally and comprising a first part, spaced somewhat vertically above the second part formed by the remainder of the vertically directed components and the other horizontal component, integral with such remainder, in overlapping disposition; a plurality of flexible plates disposed in parallel vertical planes which are substantially normal to the length of the bar, and symmetrically disposed at the respective sides of a vertical plane axially of the bar, said flexible plates being all joined at their upper ends to the upper part of the bar, and at their lower ends to the lower part of the bar, joining such overlapped parts, and means operatively connected to at least one of said flexible plates to sense flexing thereof, under the influence of longitudinal drag force tending to produce relative longitudinal movement of the two parts of the bar.

12. A wind tunnel model support comprising an elongated balance bar formed at one end for the support of a model, and at its other end for support from a stinger or the like, to dispose the balance bar in alignment with the direction of airflow, said balance bar being divided between its ends into two separate and inherently rigid parts disposed in longitudinally overlapping but diametrically spaced relationship, a plurality of plates oriented in parallel planes perpendicuar to the longitudinal neutral axis of the balance bar, the corresponding end, only, of each plate being secured to one part of the balance bar, and the opposite end, only, of each plate being secured to the other part of such balance bar, whereby all such plates are free in their intermediate portions, and said intermediate portions span the space between and join the two parts of the balance bar, said plates, in said intermediate portions, being inherently flexible, for flexure under the influence of compressional force directed axially of the balance bar such as serves to move one part of the bar axially relative to the other part, and means operatively connected to at least one of said plates, to sense any flexure thereof.

13. A wind tunnel model support as in claim 12, wherein the flexible plates at the respective sides of a plane located between the ends of the overlapped parts of the balance bar are of symmetrical flexibility, and a single such plate is located at that plane, the sensing means being operatively connected to the latter plate.

References Cited in the file of this patent

UNITED STATES PATENTS

| | | |
|---|---|---|
| 2,480,783 | Sloan | Aug. 30, 1949 |
| 2,485,977 | Mains | Oct. 25, 1949 |
| 2,617,179 | Burke | Nov. 11, 1952 |
| 2,662,272 | Macomber | Dec. 15, 1953 |
| 2,700,305 | Kendall | Jan. 25, 1955 |
| 2,768,526 | Trimble et al. | Oct. 30, 1956 |
| 2,782,636 | Puecker | Feb. 26, 1957 |

OTHER REFERENCES

Publication: Agard #AG2MI, "Some Applications of Strain Gages in Aeronautical Research," by I. H. Abbott, Paris, France (1952), pages 14, 26.